Dec. 19, 1933.　　　　　C. S. ASH　　　　　1,939,641
WHEEL
Filed June 22, 1931
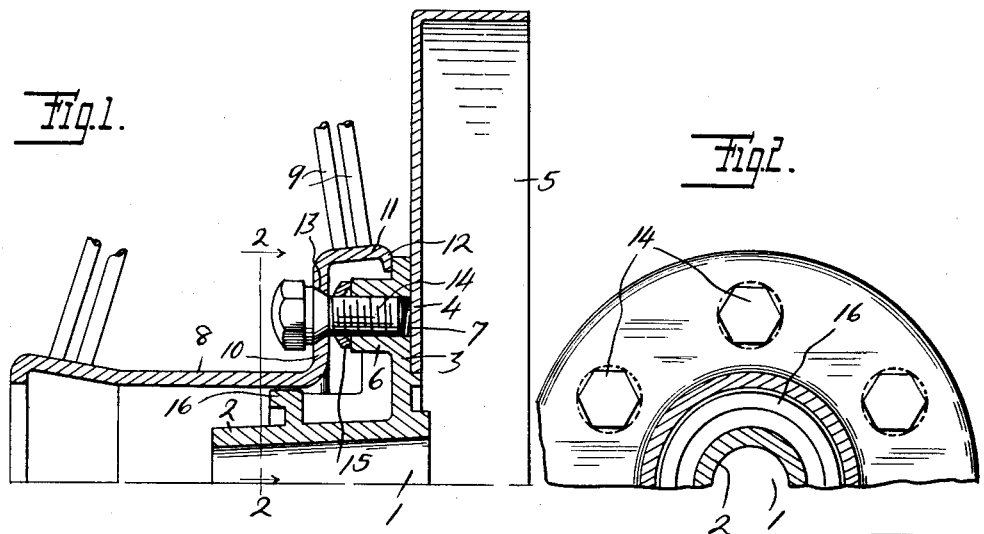
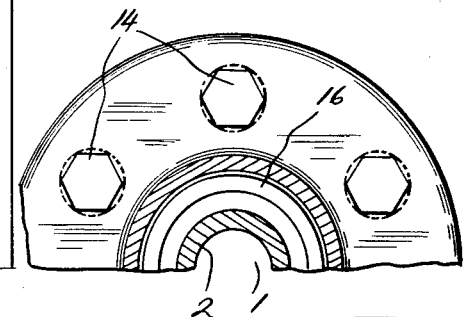
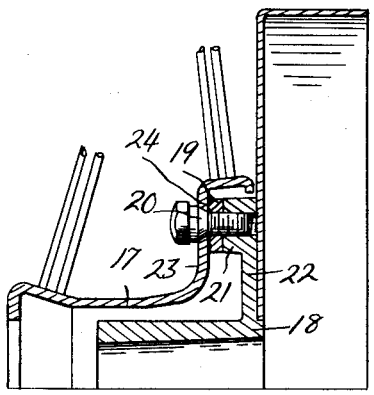
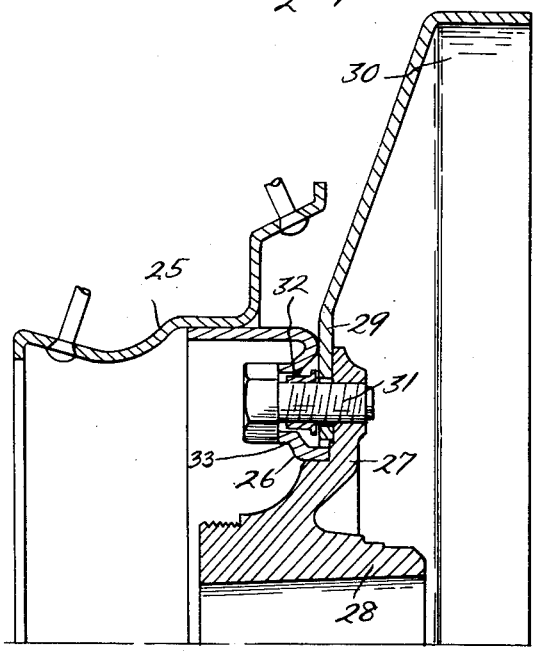
INVENTOR
Charles S. Ash
BY
ATTORNEYS Patented Dec. 19, 1933

1,939,641

UNITED STATES PATENT OFFICE 1,939,641

WHEEL

Charles S. Ash, Birmingham, Mich., assignor to Kelsey - Hayes Wheel Corporation, Detroit, Mich., a corporation of New York Application June 22, 1931. Serial No. 546,083

5 Claims. (Cl. 301—9)

The invention relates to wheels and refers more particularly to wire wheels for motor vehicles. One of the objects of the invention is to simplify the construction of demountable wheels and, more particularly, wire wheels and also to facilitate mounting of the wheels and insuring security of such mounting. Another object is to provide simple means for securing a wheel in place upon the inner hub, which means will effectively hold the wheel in place and obviate the possibility of accidental disconnection and demounting of the wheel. A further object is to provide a construction and arrangement whereby all load, driving and braking stresses are transmitted between the wheel and the inner hub through a frictional connection between these parts and in which the means for creating such frictional connection also serves as fastening means for holding the wheel in place upon the inner hub and which fastening means may be easily and quickly released for the purpose of demounting the wheel.

These and other objects of the invention will become apparent from the following description, taken in connection with the accompanying drawing, in which Figure 1 is a central section through a wheel showing an embodiment of my invention;

Figure 2 is a section on the line 2—2 of Figure 1;

Figures 3 and 4 are other views showing embodiments of my invention.

In the construction shown in Figure 1, 1 is the metal inner hub preferably formed of cast metal and having the barrel 2 and the integral radially outwardly extending annular flange 3 to the rear or inboard side of which is fixedly secured the web 4 of the brake drum 5. The flange 3 is provided with the annular series of integral bosses 6 extending forwardly or from the outboard side of the flange and having the axially extending threaded openings 7.

The demountable wheel is a wire wheel having the sheet metal outer hub or hub shell 8 into which the wire spokes 9 are laced with their outer ends connected to a suitable rim member. The rear or inboard end of the outer hub or hub shell has the radially outwardly extending flange 10 which is provided with the peripheral rearwardly extending annular flange 11 terminating at its rear edge in the radially inwardly extending flange 12. The flange 10 is provided with the annular series of holes 13 corresponding in number to the threaded openings 7 and adapted to register therewith. The outer hub or hub shell is detachably secured to the inner hub by means of the bolts 14 which extend through the holes 13 and threadedly engage the openings 7. These bolts firmly secure the inwardly extending flange 12 against the flange 3 and the contacting faces of these flanges are preferably roughened so that the load, driving and braking stresses are transmitted between the inner hub and the outer hub or hub shell independently of the bolts, or in a manner to relieve the bolts of these stresses, so that the only stresses to which the bolts are subjected are those incurred in drawing the outer hub or hub shell into frictional contact with the inner hub. Inasmuch as the flange 10 is spaced from the flange 3 when the bolts are tightened up, this flange 10 will spring or yield slightly toward the flange 3 and thus bind the bolts in the threaded openings 7, so that they cannot become accidentally displaced.

15 are spring washers encircling the bolts 14 and interposed between the ends of the bosses 6 and the flange 10 of the outer hub or hub shell, there being one spring washer for each bolt. These spring washers have threaded openings for receiving the bolts, so that when the bolts are screwed in the washers will engage the ends of the bosses and, by reason of their being transversely curved or bowed in a direction such that their peripheries first come into contact with the bosses, these spring washers will be sprung or flattened slightly, thereby gripping the bolts. When the bolts are retracted in taking the wheel off, the bolts upon being screwed out recede from the openings in the bosses and also through the washers until the ends of the bolts leave the bosses, when the wheel may be removed carrying the bolts with it, the washers holding the bolts from dropping out of the openings in the flange 10 of the outer hub or hub shell and becoming lost.

A radially outwardly extending annular flange or rib 16 is preferably provided upon the barrel 2 of the inner hub for the purpose of guiding the outer hub or hub shell to place, but this flange or rib has a height such that there will be clearance between it and the outer hub or hub shell when the wheel is secured in place upon the inner hub, so that this flange or rib serves as a guide only while mounting the wheel, but all load, driving and braking stresses are taken by the flange 12 of the outer hub or hub shell.

In the modification shown in Figure 3, the construction is very similar, with the exception that the outer hub or hub shell 17 does not directly contact with the inner hub 18. In this construction friction spacers 19 are provided mounted upon the securing bolts 20 and between the ends of the bosses 21 on the inner hub flange 22 and the radially outwardly extending flange 23 of the outer hub or hub shell, there being one spacer for each bolt. These spacers are preferably internally threaded to screw upon the bolts and thus form means for retaining the bolts in place within their openings in the outer hub or hub shell when the bolts are retracted from the inner hub. The spacers are also preferably formed with toothed or roughened end faces 24 so that when the bolts are screwed up these roughened faces will firmly grip or be pressed into the metal of the flange 23 of the outer hub or hub shell and the ends of the bosses thereby increasing the frictional contact or engagement.

In the modification shown in Figure 4 the outer hub or hub shell 25 has the rearwardly opening annular channel 26 at its rear or inboard end and the inner and outer edges of this channel are adapted to respectively engage the radially outwardly extending flange 27 of the inner hub 28 and the web 29 of the brake drum 30 when the demountable wheel is mounted upon the inner hub. 31 are the securing bolts extending axially between the inner and outer flanges of the channel and threaded into the flange 27 and 32 are sleeves encircling the securing bolts, there being one sleeve for each bolt. Each sleeve extends through the axially extending flange 33 on the web of the channel 26 and is internally threaded for engaging the bolt and is flared outwardly at its rear or inboard end so that it cannot become accidentally disengaged from the outer hub or hub shell. As a result, these sleeves function to secure the bolts from accidental disengagement from the outer hub or hub shell.

What I claim as my invention is:

1. In a wheel, the combination of an inner hub having a radially extending portion, a wheel body member arranged upon the hub and having a radially extending portion spaced from the radial portion of the hub, threaded securing members extending through the radial portion of the wheel body member and engaging the radial portion aforesaid of the hub, and internally threaded spring washers upon said securing members between said radial portions and coacting with one of the latter portions upon tightening the securing members to prevent accidental loosening of said members, said washers also operable to hold the securing members in assembled relationship with the wheel body member.

2. In a wheel, the combination of an inner hub having a radial flange, an outer hub seated upon the inner hub and also having a radial flange, threaded securing members extending through the radial flange on the outer hub and engaging the radial flange on said inner hub, and resilient concave elements threaded upon the securing members between the flanges and coacting with one of the latter flanges upon tightening the securing members to grip said members and thereby prevent accidental loosening of the same, said concave elements also operable upon loosening the securing members to hold the latter in assembled relationship with the outer hub.

3. In a wheel, the combination of a hub having a radially extending portion, a wheel body member arranged upon the hub and having a radially extending portion spaced from the radial portion on the hub, threaded securing members extending through the radial portion aforesaid of the wheel body member and engaging the radial portion of the hub, and means on said securing members between the radial portions aforesaid and coacting with one of the latter portions upon tightening the members to prevent accidental loosening of said members and operable upon disengaging the latter from the inner hub to hold the same in assembled relationship with the wheel body member.

4. In a wheel, the combination of a hub having a radially extending portion, a wheel body member arranged upon the hub and having a radially extending portion spaced from the radial portion on the hub, threaded securing members extending through the radial portion aforesaid of the wheel body member and engaging the radial portion of the hub, and elements threaded upon the securing members between the portions aforesaid and engageable with the radial portion aforesaid of the hub upon tightening said members to prevent accidental loosening of the same and operable upon disengaging said members from the hub to hold the latter in assembled relationship with the wheel body member.

5. In a wheel, the combination of a pair of members having substantially radially extending surfaces spaced from each other axially of the wheel, threaded securing members extending axially through the surfaces aforesaid of said members, and means on the securing members between the radial surfaces and coacting with one of the latter upon tightening the members to prevent accidental loosening of said members and operable to permanently retain the securing members in assembled relationship with one of said members.

CHARLES S. ASH.